United States Patent
Dong et al.

(10) Patent No.: US 7,535,848 B2
(45) Date of Patent: May 19, 2009

(54) SYSTEM AND METHOD FOR ASSOCIATING IP SERVICES TO MOBILE SUBSCRIBERS

(75) Inventors: Wei Dong, Richardson, TX (US); Geoffrey D. Bourne, Allen, TX (US)

(73) Assignee: Tektronix, Inc., Beaverton, OR (US)

( * ) Notice: Subject to any disclaimer, the term of this patent is extended or adjusted under 35 U.S.C. 154(b) by 593 days.

(21) Appl. No.: 11/217,692

(22) Filed: Sep. 1, 2005

(65) Prior Publication Data

US 2006/0262736 A1 Nov. 23, 2006

Related U.S. Application Data

(63) Continuation-in-part of application No. 11/131,451, filed on May 17, 2005.

(51) Int. Cl.
*H04L 12/26* (2006.01)
(52) U.S. Cl. .................................. 370/241; 370/259
(58) Field of Classification Search .................. 370/259, 370/241
See application file for complete search history.

(56) References Cited

U.S. PATENT DOCUMENTS

| 6,381,306 | B1 | 4/2002 | Larson et al. |
| 6,480,485 | B1 | 11/2002 | Kari et al. |
| 6,556,820 | B1 | 4/2003 | Le et al. |
| 7,313,108 | B2 | 12/2007 | Scobbie et al. |
| 2002/0150096 | A1 | 10/2002 | Sjoblom |
| 2003/0043762 | A1 | 3/2003 | Pang et al. |
| 2004/0008650 | A1 | 1/2004 | Le et al. |
| 2004/0095894 | A1 | 5/2004 | Eloranta et al. |
| 2004/0157629 | A1 | 8/2004 | Kallio et al. |
| 2004/0264405 | A1 | 12/2004 | MacGregor Scobbie |
| 2006/0030295 | A1 | 2/2006 | Adams et al. |
| 2006/0183472 | A1 | 8/2006 | Nookala et al. |
| 2007/0070969 | A1* | 3/2007 | Malomsoky et al. ........ 370/345 |
| 2008/0045265 | A1 | 2/2008 | Yach et al. |

FOREIGN PATENT DOCUMENTS

WO 03096729 A1 5/2003

OTHER PUBLICATIONS

"Universal Mobile Telecommunications System (UMTS); Lawful interception requirements (3GPP TS 33.106 version 5.1.0 Release 5); ETSI TS 133 106" ETSI Standards, European Telecommunications Standard Institute, Sophia-Antipo, FR, vol. 3-SA3, No. V510, Sep. 2002, XP014010224 ISSN: 0000-0001.

\* cited by examiner

*Primary Examiner*—Melvin Marcelo
(74) *Attorney, Agent, or Firm*—Fulbright & Jaworski L.L.P.

(57) ABSTRACT

A system and method for subscriber tracking and creating subscriber records in a GPRS or UMTS network is disclosed. A local mapping record is created on a probe monitoring a Gi interface upon the detection of Access Start messages. Additional information is sent from a probe monitoring a Gn/Gp interface, and this information is added to the local mapping record. The processing of captured messages and the creation of local mapping record is prioritized to ensure that records for different subscribers who used the same IP address are not improperly combined. Finally, Gi traffic is tagged with unique subscriber information, such as the International Mobile Subscriber Identity (IMSI), not previously present on the Gi network.

25 Claims, 10 Drawing Sheets

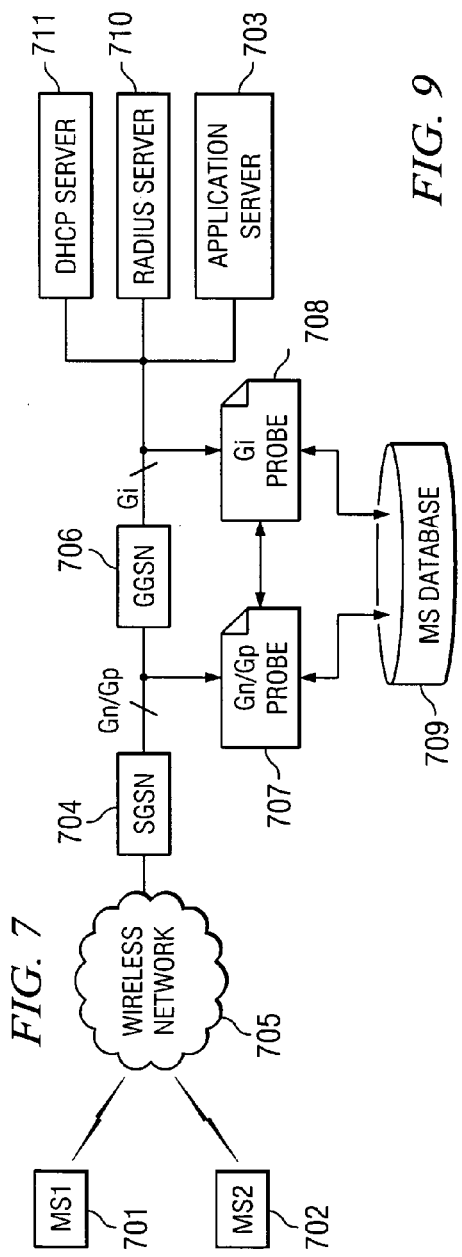

SYSTEM AND METHOD FOR ASSOCIATING IP SERVICES TO MOBILE SUBSCRIBERS

RELATED APPLICATIONS

This application is a continuation-in-part of pending U.S. patent application Ser. No. 11/131,451, entitled System and Method for Correlation of Mobile Subscriber Activity Across Multiple Interfaces in a GPRS Network, filed May 17, 2005, the disclosure of which is hereby incorporated by reference in its entirety herein.

TECHNICAL FIELD

The present invention is directed in general to creating subscriber records from messages captured on GPRS interfaces and, more particularly, to identifying subscriber records for subscribers that use the same IP address for different sessions.

BACKGROUND

FIG. 1 illustrates the architecture of an exemplary General Packet Radio Service (GPRS) network 100 that is part of a GSM public land mobile network (PLMN). GSM mobile station (MS) 101 is in communication with base transceiver station (BTS) 102, which provides radio coverage for cell 103. Several BTSs (102, 104) together are controlled by one base station controller (BSC) 105. A BTS and BSC together form a base station subsystem (BSS). The voice traffic for the mobile stations in their respective cells is routed through mobile switching center (MSC) 106, which is connected to the public switched telephone network (PSTN) 108 through gateway mobile switching center (GMSC) 107.

Several databases are used for call control and network management, including home location register (HLR) 109, MSC/visited location register (VLR) 110, authentication center (AVC) 111, and equipment identity register (EIR) 112. Permanent data, such as the user's profile, as well as temporary data, such as the user's current location, are stored in HLR 109. MSC/VLR 110 is associated with a group of location areas and stores data for those users who are currently in its area of responsibility. This includes parts of the permanent user data that have been transmitted from HLR 109 to MSC/VLR 110 for faster access. MSC/VLR 110 may also assign and store local data such as a temporary identification. AVC 111 generates and stores security-related data, such as keys used for authentication and encryption. EIR 112 registers equipment data rather than subscriber data.

In addition to telephone numbers, subscriber identifiers, and equipment identifiers, several other identifiers have been defined to help manage GSM subscriber mobility and for addressing the network elements. The international mobile station equipment identity (IMEI) uniquely identifies a mobile station similar to a serial number. The IMEI is allocated by the equipment manufacturer and registered by the network operator who stores it in the EIR. Each registered user is uniquely identified by an international mobile subscriber identity (IMSI), which is stored in the subscriber identity module (SIM). A mobile station can only be operated if a SIM with a valid IMSI is inserted into equipment with a valid IMEI.

A given subscriber is identified by a mobile subscriber ISDN number (MSISDN), which is assigned to the subscriber's SIM. A mobile station set can have several MSISDNs depending on the SIM that is installed. The VLR, which is responsible for the current location of a subscriber, can assign a temporary mobile subscriber identity (TMSI) which has only local significance in the area handled by the VLR. It is stored on the network side only in the VLR and is not passed to the HLR.

GPRS support nodes (GSN) integrate GPRS into GSM architecture. GSNs are responsible for the delivery and routing of data packets between mobile stations and external packet data networks (PDN). All GSNs are connected via an IP-based GPRS backbone network. Within the backbone, the GSNs encapsulate the PDN packets and transmit (tunnel) them using the GPRS Tunneling Protocol GTP. Serving GPRS support node (SGSN) 113 is responsible for the delivery of data packets from and to mobile stations, such as MS 101, within its service area. GPRS 113 performs packet routing and transfer, mobility management, such as attach/detach and location management, logical link management, and authentication and charging functions. A location register of SGSN 113 stores location information, such as current cell and current VLR, and user profiles, such as the IMSI or other addresses used in the packet data network, for all the GPRS users registered with SGSN 113.

Gateway GPRS support node (GGSN) 114 acts as an interface between the GPRS backbone network and external packet data network (PDN) 115. GGSN 114 converts GPRS packets coming from SGSN 113 into the appropriate packet data protocol (PDP) format, such as IP or X.25, and sends the packets out on PDN 115. In the other direction, PDP addresses of incoming data packets are converted to the GSM address of the destination user, such as MS 101. The re-addressed packets are sent to SGSN 113, which is serving MS 101. GGSN 114 stores the current SGSN address of the user and his or her profile in its location register.

There is a many-to-many relationship between SGSNs and GGSNs in a GPRS network. A single GGSN may serve as the interface to external packet data networks for several SGSNs. Alternatively, a single SGSN may route its packets over different GGSNs to reach different packet data networks. For example, SGSN 113 may be coupled to SGSN/GGSN 116 in a different PLMN 117.

FIG. 1 also illustrates the various ETSI-defined interfaces between the network nodes. The Gb interface connects BSC 105 with SGSN 113. The Gn interface connects SGSNs in the same PLMN. The Gp interface is used to connect SGSNs and GGSNs in separate PLMNs. The Gi interface connects the PLMN with external public or private PDNs, such as the Internet or corporate intranets. Using the Gf interface, SGSN 113 may query EIR 112 regarding the IMEI of a mobile station trying to register with the network.

HLR 109 stores the user profile, the current SGSN address, and the PDP address(es) for each GPRS user in the PLMN. The Gr interface is used to exchange this information between HLR 109 and SGSN 113. For example, SGSN 113 informs HLR 109 about the current location of MS 101. When MS 101 registers with a new SGSN, HLR 109 will send the user profile to the new SGSN. The Gc interface between GGSN 114 and HLR 109 may be used by GGSN 114 to query a user's location and profile in order to update its location register. MSC/VLR 110 may include functions and register entries that allow coordination between packet-switched (GPRS) and circuit-switched (conventional GSM) services. For this purpose, the Gs interface connects the databases of SGSN 113 and MSC/VLR 110. The Gd interface interconnects SMS gateway MSC (SMS-GMSC) 118 with SGSN 113 to exchange short message service (SMS) messages via GPRS.

Before MS 101 can use GPRS services, it must register with SGSN 113 of the GPRS network. SGSN 113 checks if the user is authorized, copies the user profile from HLR 109 and assigns a packet temporary mobile subscriber identity (P-TMSI) to the user. This procedure is called GPRS attach. For mobile stations using both circuit switched and packet switched services it is possible to perform combined GPRS/IMSI attach procedures. The disconnection from the GPRS network is called GPRS detach. The mobile station or the network can initiate the GPRS detach.

After a successful GPRS attach, MS 101 must apply for one or more addresses used in PDN 115 to exchange data packets with devices, such as server 119, in external PDN 115. For example, MS 101 must be assigned an IP address if PDN 115 is an IP network. This address is called a PDP (Packet Data Protocol) address. For each session, a PDP context is created, which describes the characteristics of the session. The PDP context contains the PDP type, the PDP address assigned to the mobile station, the requested quality of service, and the address of GGSN 114 that serves as the access point to PDN 115. This context is stored in MS 101, SGSN 113, and GGSN 114. With an active PDP context, MS 101 is "visible" to external PDN 115 and is able to send and receive data packets. The mapping between the two addresses, PDP and IMSI, enables GGSN 114 to transfer data packets between PDN 115 and MS 101. A user may have several simultaneous PDP contexts active at a given time.

The allocation of the PDP address can be static or dynamic. In the first case, the network operator of the user's home-PLMN permanently assigns a PDP address to the user. In the second case, a PDP address is assigned to the user upon activation of a PDP context. The PDP address can be assigned by the operator of the user's home-PLMN (dynamic home-PLMN PDP address) or by the operator of the visited network (dynamic visited-PLMN PDP address). The home network operator decides which of the possible alternatives may be used. In case of dynamic PDP address assignment, the GGSN is responsible for the allocation and the activation/deactivation of the PDP addresses.

It is difficult to monitor and track related GPRS packets as they are communicated on different interfaces between various network nodes. This is because each packet may include different parameters. Accordingly, there is a need in the prior art to correlate packets that are exchanged in the GPRS network.

Universal Mobile Telecommunication System (UMTS) is a third-generation (3G) wireless system that delivers high-bandwidth data and voice services to mobile users. UMTS evolved from the Global System for Mobile communications (GSM). UMTS uses an air interface based on W-CDMA and the core GPRS network. Accordingly, the UMTS core network also includes SGSN and GGSN components.

SUMMARY OF THE INVENTION

The present invention provides a system and method for creating subscriber records in a GPRS system. Monitoring probes are used to capture signaling units, messages, or data packets that are exchanged across the various interfaces in the GPRS network. There are a number of parameters that may be associated with a particular subscriber's connection, such as IMSI, TLLI, NodeId, PTMSI, RAND UI, Algorithm Type, Triplet Index, MSISDN, Routing Area Index, and Authentication Triplet (Kc, RAND, SRES), which are further defined in TABLE 1 below. However, each message will not include all of these parameters. Therefore, there is a need for a system and method to correlate related messages into a single subscriber record using the messages that are captured from different GPRS interfaces.

When a subscriber has an active session or context, information is exchanged across the GPRS interfaces. Different types of messages are exchanged across different interfaces. A new subscriber record is created for each GPRS interface message that cannot be correlated to an existing record. The subscriber records are then updated as additional messages are captured. When information is added to an existing record, the updated record may also be compared to other subscriber record to determine whether multiple records should be combined.

By correlating the subscriber information into a single record, it is possible to use information collected on one interface to analyze messages captured on another interface. For example, the messages on the Gb interface may be encrypted and, therefore, their contents cannot be read without the keys required to decrypt the message. The keys are available from messages on other interfaces, such as the Gr, Gn, or Gp interfaces. By correlating all of the information into a single subscriber record, messages on the Gb interface may be decrypted using the keys that are captured from related messages on another interface.

Even though subscriber identities, such as IMSI, are not always transmitted in all messages on all interfaces, the present subscriber tracking invention provides the capability to filter on subscribers' identities, even when the identity does not exist in the messages that are part of the call. These filtering capabilities are supported for both real-time and historical analysis.

A GGSN in a GPRS network is typically assigned a limited pool of IP addresses that are shared by the subscribers. Each subscriber session is assigned a specific IP address; however, that IP address is assigned to another subscriber when the first subscriber's session is completed. The subscriber mapping records include IP address information, and, because the IP addresses may be reused, it is important to ensure that searches of the mapping records do not select the wrong record because of a common IP address.

In the present invention, a Gi Probe determines when a new context is established for a subscriber by detecting an Access Start Request message. The context is assigned an IP address from the pool of IP addresses. The Gi Probe creates a local mapping record using the MSISDN, APN and IP parameters captured from Access Start Request and Access Start Response messages. Upon detecting a Created PDP Context Response message, Gn/Gp Probe forwards a subset of its context mapping record to the Gi Probe. This subset of information includes MSISDN, APN, CHID, IMSI, MSIP, and timestamp information, which is all merged with the associated local mapping record.

At times messages may be received out of an expected order, thereby delaying the creation of local mapping records. In some situations, the subset of parameters from the Gn/Gp Probe may arrive before the associated local mapping record is created on the Gi Probe. The context update logic on the Gi Probe attempts to avoid this problem by prioritizing its processing of captured messages so that the Access Start Request and Access Start Response messages ("Access Start messages") have a higher priority than other messages. Furthermore, the Gi Probe context update logic preferably processes Access Start messages before processing other types of captured messages or queries.

Some embodiments of the present invention are directed to a method for creating subscriber records in a GPRS network. Upon detecting a request to initiate a new subscriber session, a first network monitoring device creates a first subscriber record. Upon detection of a message authorizing the creation of the new subscriber session, a second network monitoring device sends information from a second subscriber record to the first network monitoring device. Context update logic in the first network monitoring device combines the information from the second subscriber record with the first subscriber record to form an updated first subscriber record.

In some embodiments, the request to initiate a new subscriber session may be an Access Start Request message or an Access Start Response message on a Gi interface. The message authorizing the creation of the new subscriber session may be a Create PDP Context Response message on a Gn or Gp interface. Preferably, the first subscriber record includes a Mobile Station International ISDN Number (MSIDSN) and an Access Point Name (APN) and the information from the second subscriber record includes a Mobile Subscriber IP address (MSIP).

Embodiments of the invention may prioritize creating the first subscriber record ahead of processing of information received from the second subscriber message. The processing of captured Access Start Request or Access Start Response messages may be prioritized ahead of the processing of other subscriber information.

Upon receiving second subscriber record information, the first network monitoring device searches for an associated first subscriber record on the first network monitoring device. The first network monitoring device may search, for example, for a first subscriber record having a particular group of MSIDSN, APN, and MSIP parameters. In other embodiments, the first network monitoring device searches for a first subscriber record having a timestamp that is the closest, earlier timestamp relative to the timestamp of the second subscriber record.

The first subscriber record may include, for example, information captured from Gi Interface messages. When combined with the information from the second subscriber record, unique subscriber information that is not present in Gi Interface messages may be added to the updated first subscriber record. The unique information may include subscriber identification information, such as International Mobile Subscriber Identity (IMSI) information, that is not available from the Gi Interface.

The UMTS core network includes many of the same infrastructure components that are used in GPRS, including the SGSN and GGSN components. The GGSN component in UMTS is linked to the public data network via the same Gi Interface that is used in GPRS. Accordingly, the system described herein may also be used to monitor the network interfaces in a UMTS network and to create mapping records for UMTS subscribers. Furthermore, the present invention may also be used to create UMTS subscriber records that include information from Gi Interface messages and from other related subscriber messages so that the Gi Interface records may be linked to a particular subscriber.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 7 illustrates a system for exchanging subscriber information among probes in a network monitoring system according to embodiments of the present invention;

DETAILED DESCRIPTION

Figure 1:
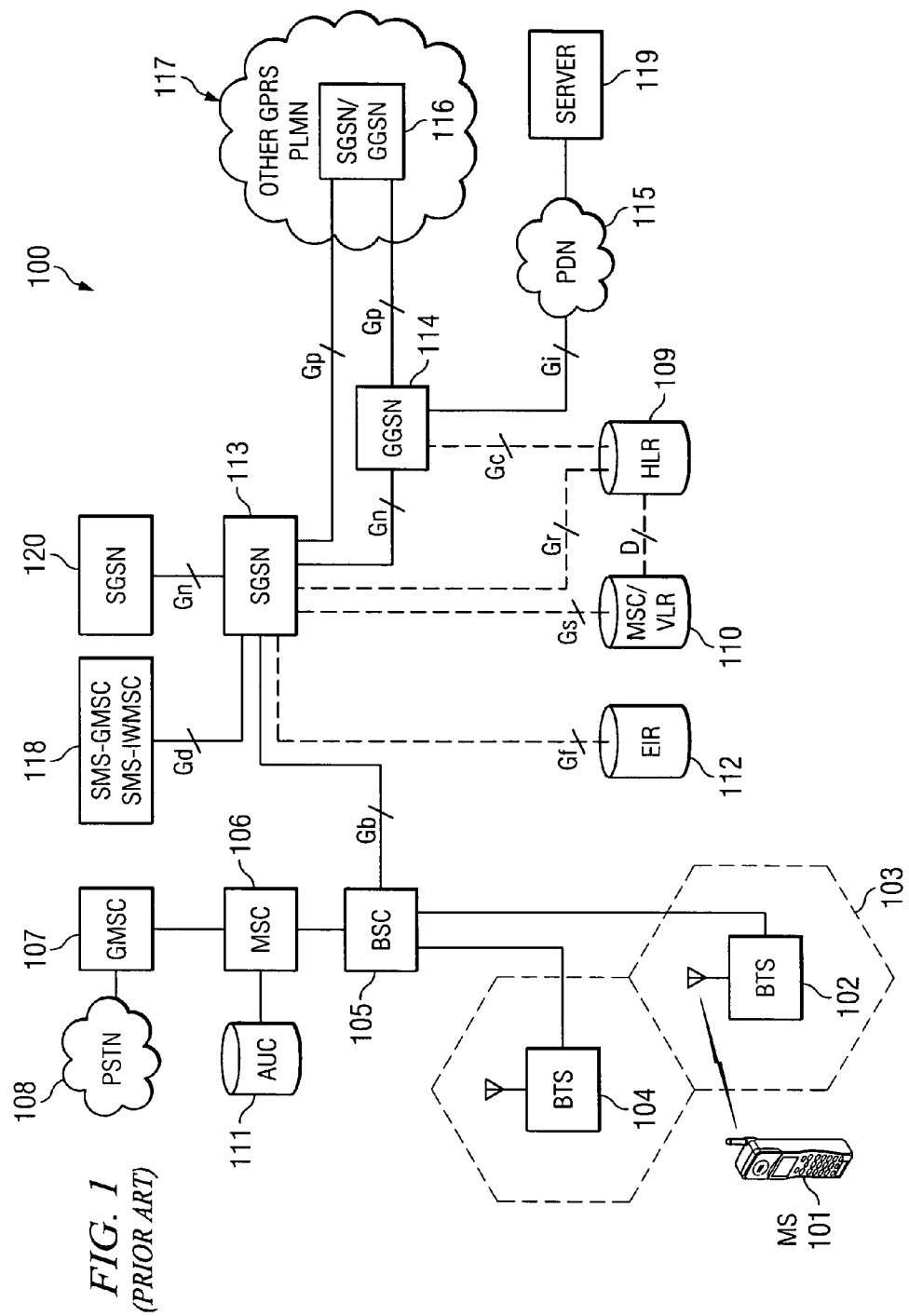
FIG. 1 is a block diagram of a GPRS network.
Figure 2:
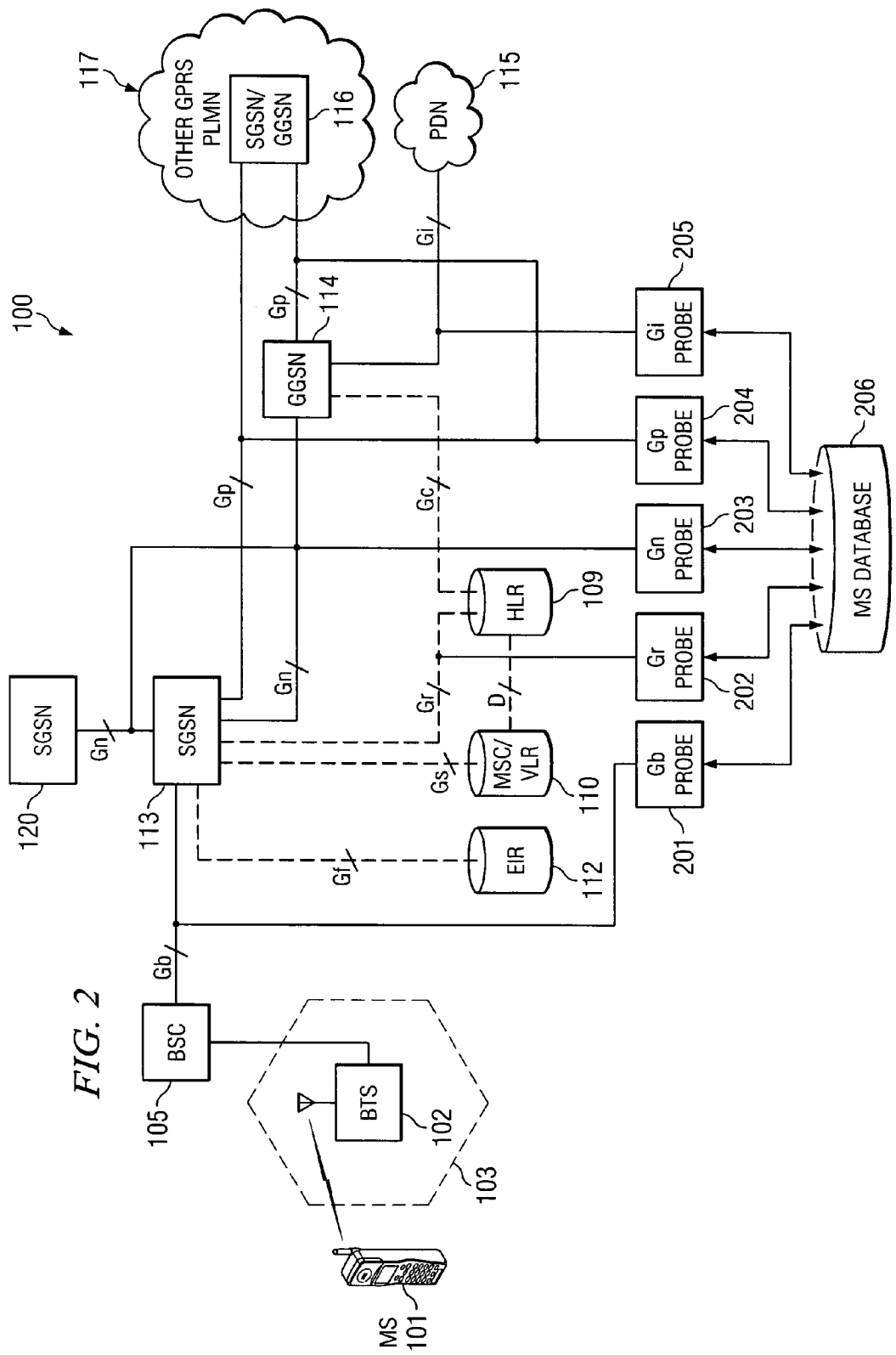
FIG. 2 is a block diagram of a monitored GPRS network according to one exemplary embodiment of the present invention.

FIG. 2 illustrates a GPRS network with monitoring probes according to an exemplary embodiment of the present invention. One or more monitoring probes may be coupled to the communications links between the components of the GPRS network. In some embodiments, the probes capture substantially all of the packets or messages that pass across the communication links. The probes are transparent to the GPRS network and do not directly affect the operation of the GPRS network. Preferably, the probes may be connected at any available point on the communication links.

Gb Probe 201 captures and monitors the packets and messages transferred across the Gb interface between BSC 105 and SGSN 113. Gr Probe captures and monitors the packets and messages transferred across the Gr interface between SGSN 113 and HLR 109. Gn Probe 203 captures and monitors the packets and messages transferred across the Gn interfaces. Gp Probe 204 captures and monitors the packets and messages transferred across the Gp interfaces. Gi Probe captures and monitors the packets and messages transferred across the Gi interface between GGSN 114 and PDN 115. It will be understood by those of ordinary skill that the various probes may be combined so as to monitor multiple links of the same or different types. For example, Gn Probe 203 and Gp Probe 204 may be combined in an alternate embodiment as a single Gn/Gp Probe (not shown).

It will be understood that other monitoring probes may be coupled to the communications links for other interfaces not listed above, such as the Gf, Gs, Gc, or Gd interfaces. Monitoring Probes 201-205 create a subscriber record from the captured packets and messages. In an alternative embodiment, monitoring probes 201-205 are coupled to each other (not shown) so that captured packets and messages may be exchanged among the monitoring probes. This allows an individual monitoring probe to create subscriber records using messages and packets captured from different network interfaces.

Monitoring probes 201-205 send the subscriber records to mobile station (MS) database 206, which tracks and stores mobile subscriber information. It will be understood by those of ordinary skill that MS database 206 may be incorporated within one of the monitoring probes 201-205 or may be a separate component. In an embodiment in which MS database 206 is part of one of the monitoring probes, it will be understood that the other monitoring probes can access database 206 in the hosting probe. Monitoring probes 201-205 can access the records stored on database 206 by other monitoring probes so that the records can be updated with information captured from other network interfaces.

The subscriber records stored in MS database 206 include one or more of the parameters listed in TABLE 1. It will be understood that this list is exemplary and that other parameters may also be included in the subscriber record in other embodiments.

TABLE 1

| Field | Description |
| --- | --- |
| Subscriber Identification | Unique subscriber identity number, created by MS database or by monitoring system |
| IMSI | International Mobile Subscriber Identity |
| TLLI | Temporary Logical Link Identity |
| NodeId | Unique network node identifier, created by MS database or by monitoring system |
| PTMSI | Temporary Mobile Subscriber Identity for the Packet Network |
| RAND UI | Random number generated by the SGSN, used as part of input parameter in ciphering |
| Algorithm Type | Current ciphering algorithm used by SGSN to cipher MS data |
| Triplet Index | Identifier to identify the authentication triplet in use |
| MSISDN | Mobile Subscriber International PSTN/ISDN Number |
| Record creation time | GMT Time |
| OC Array | Overflow counters per NSAPI, used as input parameters for ciphering algorithm |
| RAI | Routing Area Id |
| Authentication Triplet | Ciphering keys - consists of Kc, RAND, and SRES |

Each captured packet includes only a portion of the above-listed elements. Accordingly, a single packet does not provide sufficient information to create a complete record for a subscriber. Using the present invention, the parameters stored for two or more records may be compared to identify related records and to then combine the information from multiple records that are associated with a single mobile subscriber.

Figure 3:
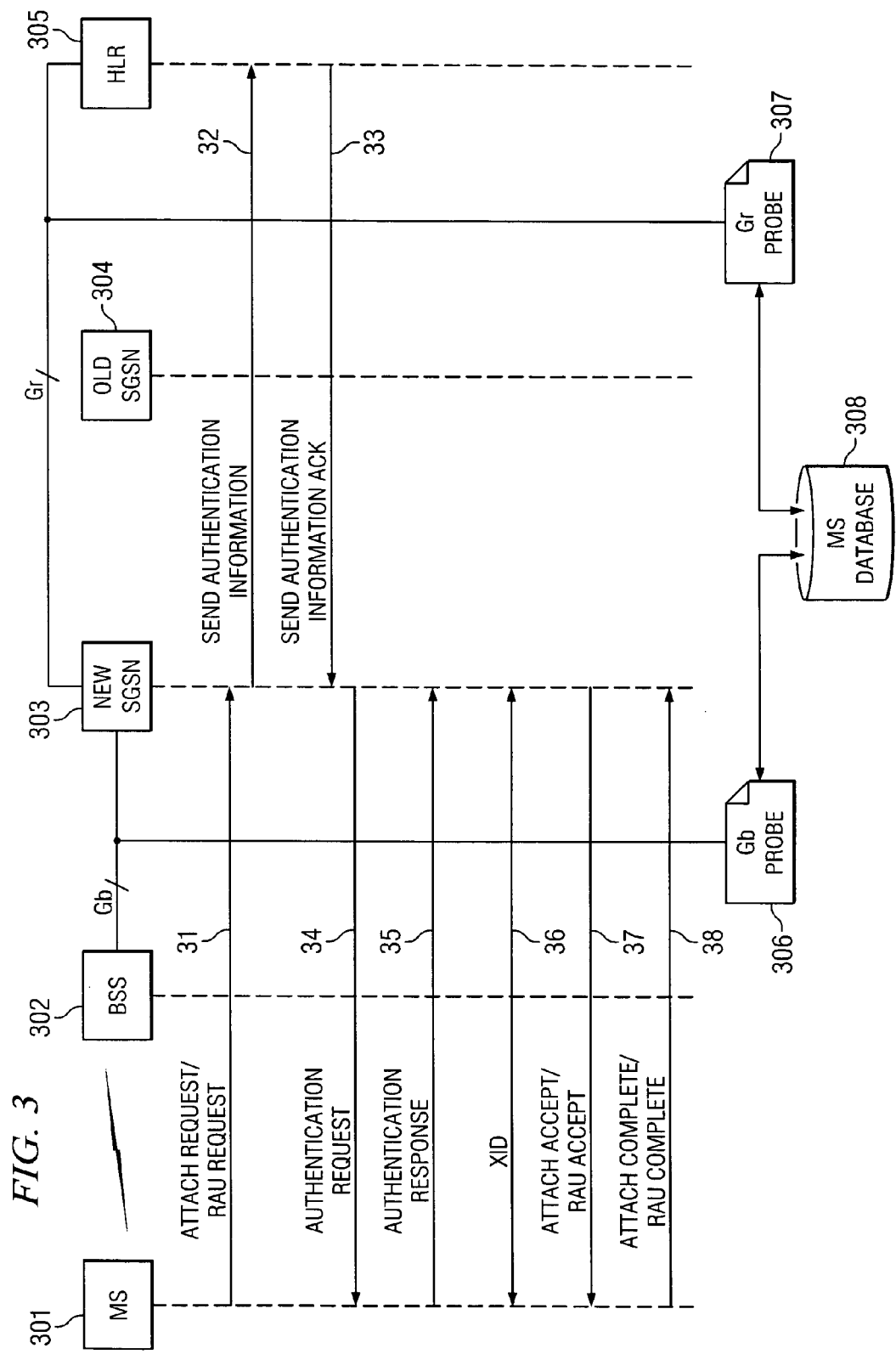
FIG. 3 illustrates a system for creating subscriber records according to an exemplary embodiment of the present invention.

FIG. 3 illustrates data packets and messages that are captured from the Gb and Gr interfaces in one embodiment of the invention. FIG. 3 represents a scenario in which SGSN 303 receives an Attach Request from MS 301. In this scenario, MS 301 is previously unknown to SGSN 303, for example, because MS 301 was previously communicating through SGSN 304. SGSN 303 does not have authentication keys available for MS 301 and must retrieve the authentication keys from HLR 305.

MS 301 sends Attach Request/RAU Request message 31 to SGSN 303 through BSS 302, which provides coverage for MS 301's current cell. Message 31 is transmitted across the Gb interface from BSS 302 to SGSN 303 and is captured by Gb Probe 306. Gb Probe 306 creates a Gb interface subscriber record using the IMSI parameter extracted from Attach Request message 31. The Gb interface subscriber record is then stored to MS database 308. Gb Probe 306 may extract IMSI, PTMSI, TLLI and RAI information from Attach Request message 31. All of this information may then be included in the Gb interface subscriber record.

SGSN 303 requests authentication keys from HLR 305 by transmitting Send Authentication Info message 32 across the Gr interface. In response, HLR 305 sends Send Authentication Info Ack message 33 back to SGSN 303 across the Gr interface. Gr Probe 307 captures messages 32 and 33, and updates the existing Gb interface subscriber record for MS 301 using the IMSI parameter that is extracted from message 32. Gr Probe 307 adds the Authentication Triplets (Kc, RAND and SRES) that are extracted from message 33 to the Gb interface subscriber record.

In an alternate embodiment, Attach/RAU Request message 31 does not include the optional IMSI parameter. In this scenario, Gb Probe 306 creates a Gb interface subscriber record for MS 301 using PTMSI information and forwards the Gb subscriber record to MS database 308. Gr Probe 307 creates a separate Gr interface subscriber record for MS 301 using the IMSI information from Send Authentication Info and Send Authentication Info Ack messages 32 and 33. The Send Authentication Info messages do not include PTMSI information and, therefore, cannot immediately be correlated to the existing Gb subscriber record for MS 301. The new Gr subscriber record from Gr Probe 307 is also sent to MS database 308.

The Gr and Gb subscriber records may be completed or further filled out using data extracted from the other messages exchanged between SGSN 303 and MS 301. Authentication Request 34 and Authentication Response 35 messages are exchanged across the Gb interface to authenticate the mobile subscriber. These messages are captured by Gb Probe 306, which recognizes the TLLI information as corresponding to an existing subscriber record. Gb Proble 306 updates its existing Gb subscriber record for MS 301 by adding the RAND and IMSI information from messages 34 and 35.

The updated Gb subscriber record is provided to MS database 308, which searches for duplicate or related entries. The RAND and SRES information can be used to match information collected from the Gb interface with the information collected from the Gr interface. The Gr subscriber record is then merged with the updated Gb subscriber record for MS 301. Similarly, messages 36-38 are exchanged across the Gb interface to complete the attach request, and these messages are captured by Gb Probe 306 and are used to further update the merged subscriber record.

TABLE 2 illustrates the data that is extracted from the messages captured in FIG. 3. This data is then used to create the records in MS database 308.

TABLE 2

| Message | Extracted Data |
| --- | --- |
| 31 - Attach Request/RAU Request | IMSI, PTMSI, TLLI, RAI |
| 32 - Send Authentication Info | IMSI |
| 33 - Send Authentication Info Ack | Authentication Triplets (Kc, RAND, SRES) |
| 34 - Authentication Request | TLLI, Authentication Type, RAND |
| 35 - Authentication Response | TLLI, SRES |
| 36 - XID | RAND-UI |
| 37 - Attach Accept/RAU Accept | PTMSI, TLLI |
| 38 - Attach Complete/RAU Complete | TLLI |

Figure 4:
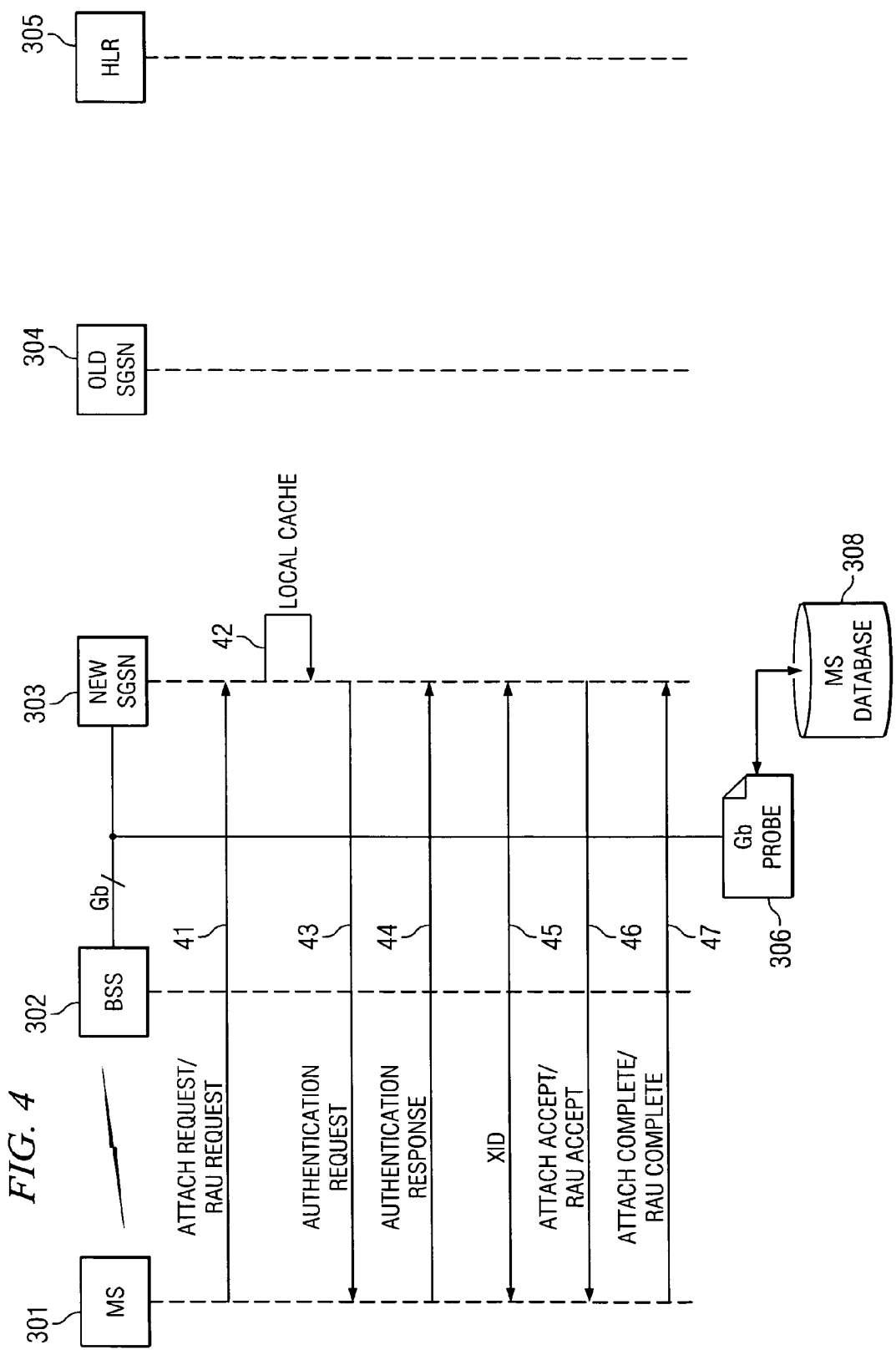
FIG. 4 illustrates a system for creating subscriber records according to an exemplary embodiment of the present invention.

FIG. 4 illustrates another embodiment of the present invention. In FIG. 4, SGSN 303 has the required authentication keys or uses its own cache of keys, so no authentication key exchange is required as part of the attach. MS 301 sends attach request message 41 to SGSN 303, and Gb Probe 306 captures message 41. Gb Probe 306 creates a new Gb subscriber record using either the IMSI information extracted from message 41. If the IMSI information is not available, the new Gb record is created using the PTMSI information.

Message 42 is a query to a local cache memory at SGSN 303 to retrieve the authentication triplets (Kc, RAND, and SRES). This information is used to create Authentication Request message 43, which is also captured by Gb Probe 306. In the scenario illustrated by FIG. 4, SGSN 303 ciphers mobile subscriber data using keys stored in a local cache. These keys were fetched from a previous look up to HLR 305, so a new look up, such as message 32, is not required. Subscriber information, such as the authentication triplets, may be stored permanently in the subscriber database so that the Gb Probe can mimic the behavior of SGSN 303.

Authentication information, such as RAND and SRES, is collected from messages 43 and 44; and the TLLI information in messages 43 and 44 is used to correlate these messages to the existing Gb subscriber record that was created upon detection of message 41. Additional information is collected from messages 45-47 as they are captured by Gb Probe 306. TABLE 3 lists the information that can be captured from the messages in FIG. 4 and that can be used to create and match subscriber records.

TABLE 3

| Message | Extracted Data |
| --- | --- |
| 41 - Attach Request/RAU Request | IMSI, PTMSI, TLLI, RAI |
| 43 - Authentication Request | TLLI, Authentication Type, RAND |
| 44 - Authentication Response | TLLI, SRES |
| 45 - XID | RAND-UI |
| 46 - Attach Accept/RAU Accept | PTMSI, TLLI |
| 47 - Attach Complete/RAU Complete | TLLI |

Figure 5:
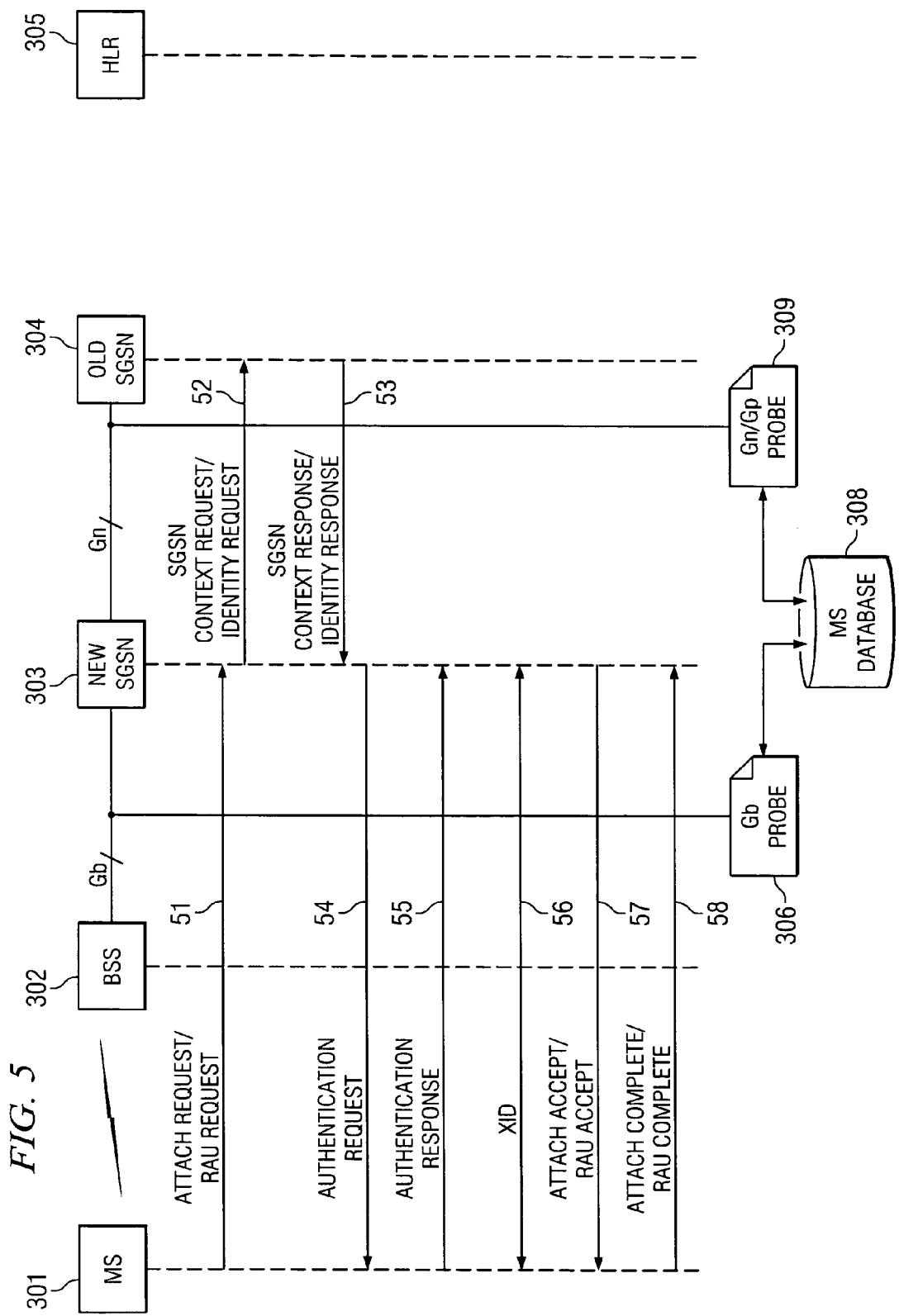
FIG. 5 illustrates a system for creating subscriber records according to an exemplary embodiment of the present invention.

FIG. 5 illustrates another embodiment of the present invention in which authentication keys are available on another SGSN and must be transferred to a new SGSN as part of an attach request. Attach request 51 is captured by Gb Probe 306 and is used to create a new Gb subscriber record, as described above for messages 31 and 41. Probe 306 sends the Gb subscriber record to database 308. SGSN 303 receives message 51 and queries SGSN 304 via message 52 for authentication information. SGSN 304 returns the authentication information in message 53.

Messages 52 and 53 are sent across the Gn interface and are captured by Gn/Gp Probe 309, which creates a new Gn/Gp subscriber record based upon the information in messages 52 and 53. Gn/Gp Probe 309 sends the Gn/Gp subscriber record to database 308, which correlates the Gn/Gp record to the Gb subscriber record by matching parameters such as the IMSI or TLLI information, for example.

The attach process is complete via messages 54-58, in the same manner as described above for messages 34-38 and 43-47, and as known to those of ordinary skill. TABLE 4 lists the information that can be captured from the messages in FIG. 5 and that can be used to create and match subscriber records.

TABLE 4

| Message | Extracted Data |
| --- | --- |
| 51 - Attach Request/RAU Request | IMSI, PTMSI, TLLI, RAI |
| 52 - SGSN Context Request/ Identity Request | IMSI, RAI, TLLI, PTMSI, TEID, IP, Port |
| 53 - SGSN Context Response/ Identity Response | IMSI, TEID, IP, Port, Current Kc, Authentication Triplets (Kc, RAND, SRES) |
| 54 - Authentication Request | TLLI, Authentication Type, RAND |
| 55 - Authentication Response | TLLI, SRES |
| 56 - XID | RAND-UI |
| 57 - Attach Accept/RAU Accept | PTMSI, TLLI |
| 58 - Attach Complete/RAU Complete | TLLI |

Referring again to FIG. 4, in one embodiment, Gb Probe 306 creates a subscriber record using IMSI extracted from attach request 41. That subscriber record may be stored to database 308. Gn/Gp Probe 309 updates the subscriber record with authentication triplets extracted from SGSN context response 53. Gb Probe 306 marks the authentication key by mapping RAND in authentication request message 54 to the authentication triplets retrieved from the subscriber database. The Gb Probe may then begin deciphering the subscriber data.

Referring to FIG. 5, in an alternate embodiment, an authentication request message may be received before authentication keys are populated into the subscriber database. For example, due to queuing delays, processor loads, or network delays, Gb Probe 306 may receive authentication request 54 before the authentication keys are populated in the subscriber record by Gn/Gp Probe 309. If Gb Probe 306 is unable to retrieve authentication information from subscriber database 308, Gb Probe 306 will try to re-fetch the key information.

Gb Probe 306 may stop processing captured messages if it is waiting for authentication keys. This would cause the probe to fall behind and it would have a difficult time catching up if the call volume was high. Also, it is inefficient to have the probe's processor to be idle while waiting for the keys. In order to avoid problems associated with unprocessed messages and idle processors, a per-subscriber wait queue is used in a preferred embodiment. When Gb Probe 306 does not have the keys necessary to decipher the subscriber data, then the messages for that subscriber will be queued, but the probe will continue to process the messages for other subscribers until the keys are received.

Figure 6:
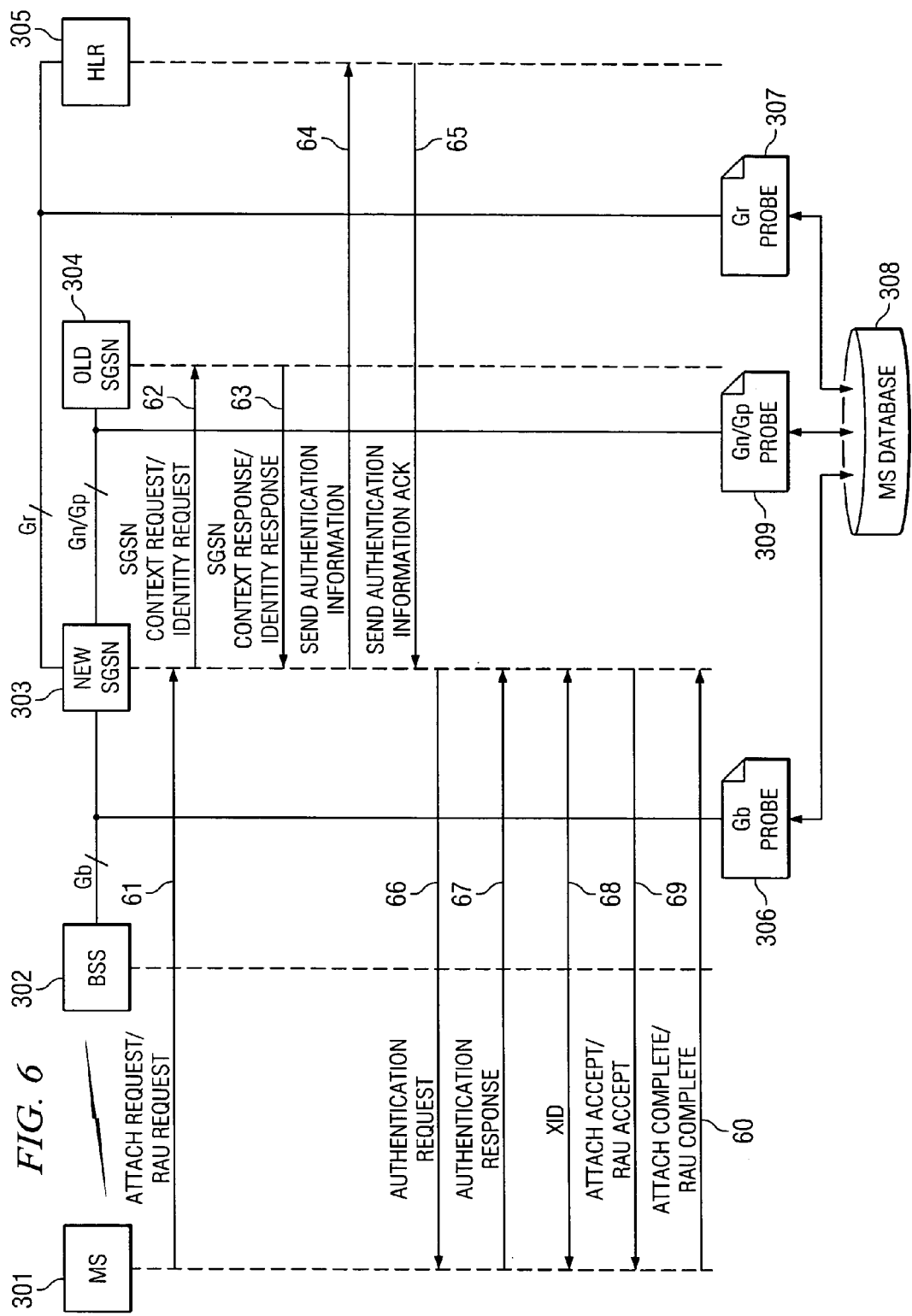
FIG. 6 illustrates a system for creating subscriber records according to an exemplary embodiment of the present invention.

FIG. 6 illustrates a synchronized subscriber tracking scenario using messages captured from the Gb, Gr, and Gn/Gp interfaces. TABLE 5 lists the data that may be extracted from the protocol data units that are exchanged in the embodiment illustrated in FIG. 6. MS 301 initially attempts to attach via message 61, which prompts SGSN 303 to request authentication keys from SGSN 304 in message 62. In the scenario illustrated in FIG. 6, SGSN 304 notifies SGSN 303 that is out of old keys via message 63. SGSN 303 then fetches new keys from HLR 305 via messages 64 and 65. Gb Probe 306, Gr Probe 307, and Gn/Gp Probe 309 capture the messages from the Gb, Gr, and Gn/Gp interfaces and create and update the subscriber record for MS 301.

TABLE 5

| Message | Extracted Data |
| --- | --- |
| 61 - Attach Request/RAU Request | IMSI, PTMSI, TLLI, RAI |
| 62 - SGSN Context Request/Identity Request | IMSI, RAI, TLLI, PTMSI, TEID, IP, Port |
| 63 - SGSN Context Response/Identity Response | IMSI, TEID, IP, Port, Current Kc, Authentication Triplets (Kc, RAND, SRES) |
| 64 - Send Authentication Info | IMSI |
| 65 - Send Authentication Info Ack | Authentication Triplets (Kc, RAND, SRES) |
| 66 - Authentication Request | TLLI, Authentication Type, RAND |
| 67 - Authentication Response | TLLI, SRES |
| 68 - XID | RAND-UI |
| 69 - Attach Accept/RAU Accept | PTMSI, TLLI |
| 60 - Attach Complete/RAU Complete | TLLI |

In one embodiment, Gb Probe 306 creates a subscriber record using IMSI information extracted from message 61. Gn/Gp Probe 309 updates the subscriber record with authentication triplets extracted from SGSN context response 63, if SGSN 304 has the authentication keys. Gr Probe 307 updates the subscriber record with authentication triplets extracted from send authentication info response message 65. Gb Probe 306 marks the authentication key by mapping RAND in authentication request message 66 to authentication triplets retrieved from subscriber database 308. Using the authentication key, Gb Probe 306 starts deciphering the subscriber data.

In other scenarios, the messages listed above in TABLE 5 may not include all of the listed information. This results in the need for special handling in certain exceptional cases. In one embodiment, attach request message 61 does not include optional IMSI information. In this scenario, Gb Probe 306 creates a Gb interface subscriber record using the PTMSI information. Gr Probe 307 creates a separate Gr interface subscriber record using the IMSI information in send authentication info message 64. Send authentication info messages have only IMSI information, but no PTMSI information. The Gr interface record includes RAND information, which is captured from message 65.

Gb Probe 306 captures authentication request message 66 and sends an update to the Gb interface subscriber record by passing the captured RAND and IMSI information. On receipt of the IMSI update, subscriber database 308 searches for duplicate entries and merges the Gr interface record with the Gb interface record by matching the IMSI information from both records.

As previously noted, queuing delays, probe processor loads, and network delays may result in one probe detecting and processing messages faster than another probe. For example, the Gb probe may receive authentication request message 66 before the authentication keys are populated by the Gr probe or the Gn/Gp probe. When the Gb probe fails to retrieve authentication information from the subscriber database, it attempts to re-fetch the key information by doing a configurable retry. While waiting for the keys, the Gb probe preferably continues to process information for other subscribers as the messages are received.

In some embodiments, the subscriber tracking keys may change. For example, an Attach Accept message or Routing Accept message may change the PTMSI or TLLI. The Gb probe must track both the old and new keys for this subscriber until the keys are flushed by the SGSN. The Gb probe may also have to track multiple locations, for example, if the subscriber has moved to a new location on a routing area update. The Gb probe must track both the old and new locations to successfully track the captured messages.

It will be understood that some of the interfaces in a GPRS network may not be monitored. In those cases, certain information will not be captured as the subscriber moves between monitored and unmonitored networks. In a preferred embodiment, the monitoring probes and subscriber database persistently maintain the subscriber information and dynamically match the subscriber data to existing records when a subscriber arrives at a monitored network. The subscriber database may also have an age-out mechanism to handle "stale" subscriber information. If the subscriber record is not updated or used for a configurable amount of time, then the subscriber record may be deleted. This provides a way to clear out subscriber records for visitor subscribers that briefly visit the monitored network.

In a preferred embodiment, the Gb probe maintains a subscriber data cache for faster data access. The probe may look up information in the cache based upon, for example, IMSI, PTMSI+RAI, TLLI+nodeID, or Subscriber ID.

One advantage provided by the present invention is the ability to filter the subscriber records using subscriber identities, which are not available on the original GPRS interface. With the messages merged into the subscriber records, the messages associated with a particular subscriber can be identified and analyzed separately using the present invention.

It will be understood that the subscriber record data is captured from multiple interfaces, and is processed and analyzed at near real-time. This allows operators to monitor the current status of the network. As used in this disclosure, the term near real-time means that the subscriber records are being created and updated while a connection is in progress so that information is available to the operator for the users currently accessing the GPRS network. The subscriber records are also stored and can be retrieve at a later time for historical analysis of the network operation.

Using the subscriber records described herein, service providers and operators can track the subscriber's entire call. The analysis and binding of signaling units or messages into a subscriber record provides operators with end-to-end call tracking.

In one embodiment of the invention, a system for creating subscriber records in a GPRS network comprises processors coupled to GPRS interfaces and operable to capture messages from the GPRS interfaces; a database for storing subscriber records created from the messages captured from the GPRS interfaces; a processor for combining associated subscriber records to form merged subscriber records; and a processor for subscriber tracking and deciphering messages on GPRS interfaces using information from the captured messages and the merged subscriber records. It will be understood that the processors may be embodied as separate microprocessors or as several processing entities or applications running on one or more microprocessors.

FIG. 7 is a high level diagram of portions of a GPRS network in which mobile subscribers, MS1 701 and MS2 702, establish communication sessions with Application Server 703 in the public data network. The mobile subscribers are coupled to SGSN 704 via wireless network 705. SGSN 704 is coupled via a Gn/Gp interface to GGSN 706, which is coupled to Application Server 703 via a Gi interface. Dynamic IP addresses for the sessions between the mobile subscribers and Application Server 703 are typically established using Radius Server 710 or Dynamic Host Control Protocol (DHCP) Server 711.

As discussed in detail above, network monitoring probes, such as probes 707 and 708, capture messages from the interfaces and create a subscriber record for each new context in the GPRS network. The subscriber records are stored in MS database 709. In the present invention, MS database 709 or Gn/Gp Probe or both can push a subset of the subscriber record to Gi probe 708 to complete a mapping record at Gi probe 708.

Figure 8A:
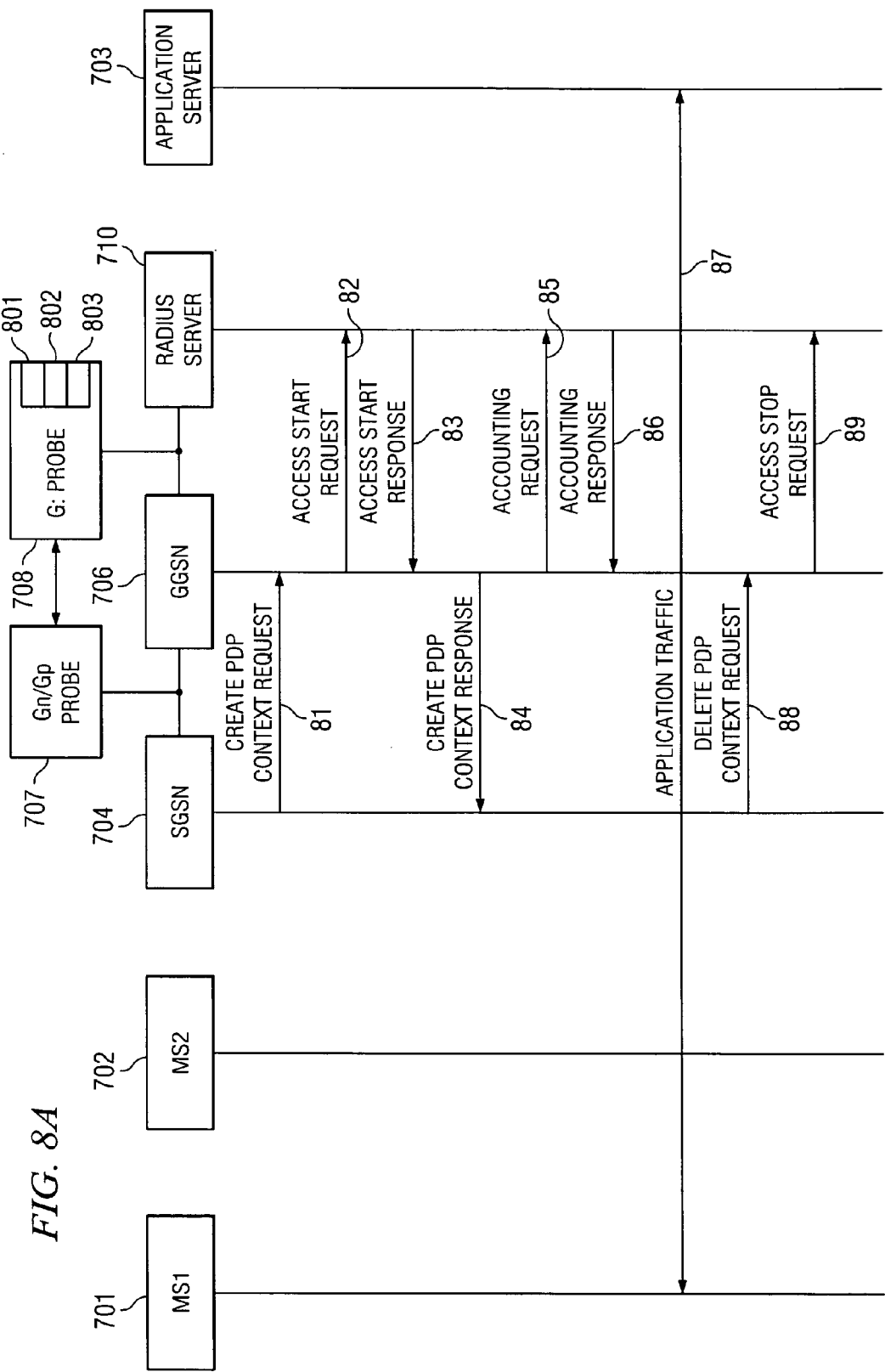
FIG. 8 illustrates traffic flow over typical Gn and Gi interfaces according to embodiments of the invention.
Figure 8B:
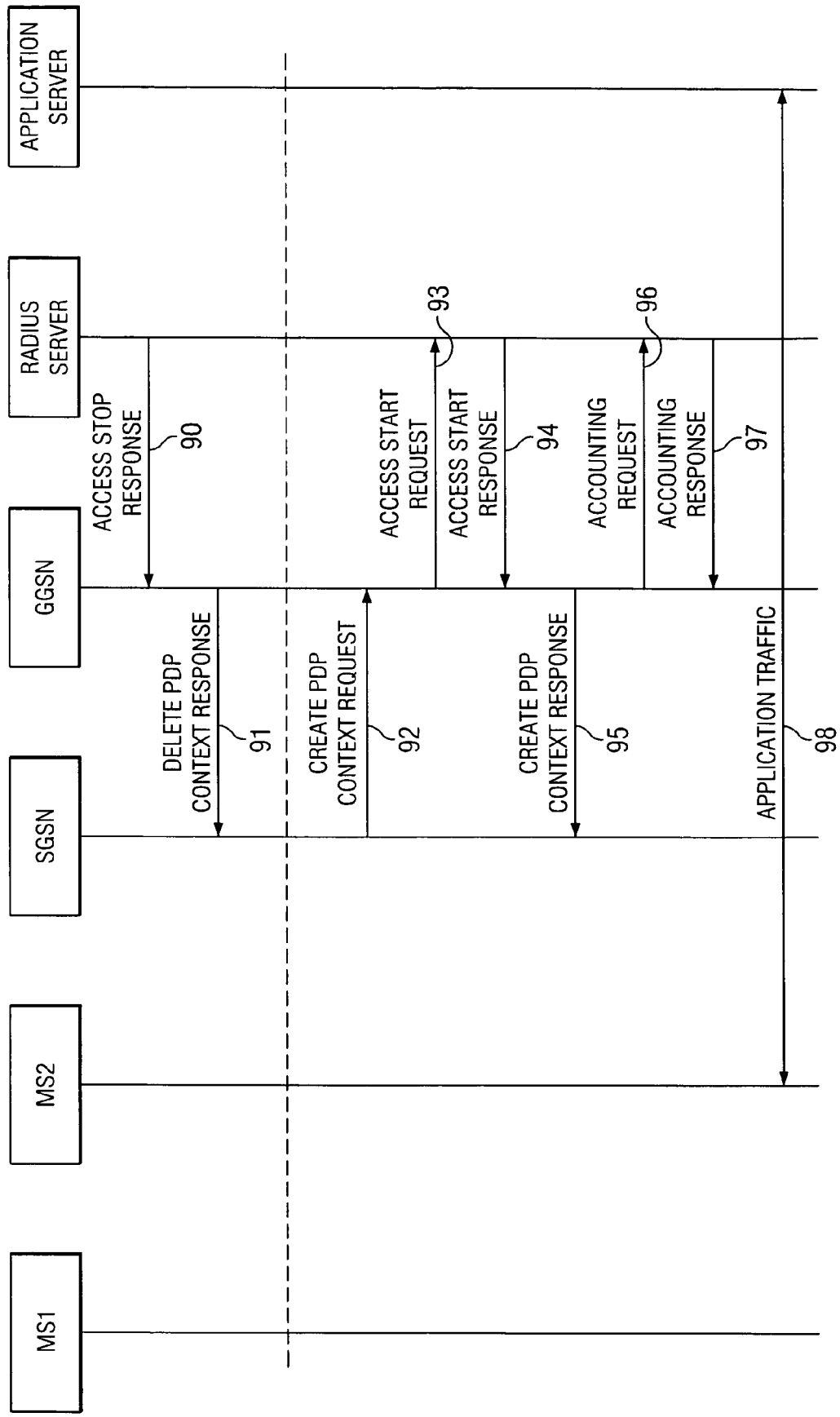

FIG. 8 illustrates traffic flow on a typical Gn and Gi interface. A tunnel to Application Server 703 is initiated by Create Packet Data Protocol (PDP) Context Request message 81. GGSN 706 establishes an IP address for the session via messages 82 and 83 to Radius Server 710. The IP address (IP1) for subscriber MS1 for the session is passed to SGSN 704 in Create PDP Context Response message 84. It will be understood that, in other embodiments, a dynamic IP address may be assigned by DHCP Sever 711 instead of Radius Server 710. Authentication, passwords, billing and other functions are accomplished using messages 85 and 86. After the transmission of Accounting Response message 86, the tunnel creation process is completed and a tunnel exists between the subscriber and a remote server. With the tunnel established between a mobile subscriber, such as MS1 701, and Application Server 703, application traffic is exchanged via message(s) 87. Application traffic refers to protocols such as HTTP, WAP, SMTP, POP3, and DNS, for example.

Table 6 lists the mapping parameters that may be extracted from messages 81-87 in FIG. 8.

TABLE 6

| Message | Extracted Data |
| --- | --- |
| 81 - Create PDP Context Request | MSISDN1, APN1, CHID1, IMSI1 |
| 82 - Access Start Request | MSISDN1, APN1 |
| 83 - Access Start Response | IP1 |
| 84 - Create PDP Context Response | IP1 |
| 85 - Accounting Request | MSISDN1, IP1 |
| 86 - Accounting Response | none |
| 87 - Application Traffic | IP1 |

When mobile subscriber MS1 701 has completed the session, the tunnel is torn down and the IP address (IP1) for MS1's session is released. To end the session for MS1 701, SGSN 704 sends Delete PDP Context Request message 88 to GGSN 706, which then exchanges Access Stop Request message 89 and Access Stop Response message 90 with Radius Server 710. GGSN 706 then sends Delete PDP Context Response message 91 to SGSN 704 to confirm that the session is ended.

Because there are a limited number of IP addresses available to the network, after some period of time address IP11 will need to be reused by another subscriber, such as MS2 702. FIG. 8 also illustrates how the address IP1 is assigned to a second subscriber. After the IP1 address is released when the session for MS1 701 ends, MS2 702 initiates a network session. SGSN 704, GGSN 706, and Radius Server 710 exchange messages 92-97, which correspond to messages 81-86 that were used to set up a session for MS1 701. To establish a session for MS2 702, Radius Server 710 assigns IP address IP1, which is the same IP address earlier used for MS1 701. Because the same IP address is being reused, the network monitoring system must ensure that it does not mistakenly combine messages related to new subscriber MS2 with the existing record for subscriber MS1. Using IP address IP1, MS2 establishes session 98 with Application Server 703 to exchange application traffic, such as the HTTP, WAP, SMTP, POP3 or DNS protocols. Although FIG. 8 shows the same Application Server 703 being accessed by both subscribers, MS1 and MS2, it will be understood that the same or different servers may be accessed by the subscribers. Similarly, it will be understood that the subscriber may access more than one application server on the public data network using its assigned IP address.

Table 7 lists the mapping parameters that may be extracted from messages 92-98 in FIG. 8.

TABLE 7

| Message | Extracted Data |
| --- | --- |
| 92 - Create PDP Context Request | MSISDN2, APN2, CHID2, IMSI2 |
| 93 - Access Start Request | MSISDN2, APN2 |
| 94 - Access Start Response | IP1 |
| 95 - Create PDP Context Response | IP1 |
| 96 - Accounting Request | MSISDN2, IP1 |
| 97 - Accounting Response | none |
| 98 - Application Traffic | IP1 |

Comparing Tables 6 and 7, it is clear that the parameters extracted from the messages associated with MS2 are unique compared to MS1 with the exception of the MSIP parameter, which is IP1 for both subscribers. Furthermore, it is clear that the MSIP parameter cannot be used by the monitoring system as the only way to identify or differentiate among subscribers.

Furthermore, an end user at Application Server 703 is unable to identify the subscriber simply by using the current IP address because the IP address is not permanently tied to a particular subscriber. It is the combination of IP address and observation time that qualifies a unique subscriber from the Application Server's perspective.

In embodiments of the present invention, Gi Probe 708 creates local mapping record 801 when it detects Access Start Request message 82. Local record 801 is stored on Gi Probe 708 and includes the MSISDN1 and APN1 parameters. Local record 801 is time-stamped with the time of message 82. When Gi Probe 708 detects Access Start Response message 83, it adds the IP1 parameter to local mapping record 801. Upon detecting Create PDP Context Request message 81, Gn/Gp Probe 707 creates a context mapping record using the parameters of message 81, or determines if the message should be associated with an existing context mapping record. When Gn/Gp Probe 707 detects Create PDP Context Response message 84, it pushes a subset of the context mapping record to Gi Probe 708, including, for example, the MSISDN1, APN1, CHID1, IMSI1, and MSIP1 parameters and the timestamp of message 81. This subset is merged in Gi Probe 708 with local mapping record 801 that was created at message 82. The information is merged by locating the record with the same MSISDN, MSIP, and APN parameters. The search of the local records is further limited by locating a local record with the timestamp of message 82 that is closest after the timestamp of message 81.

During the exchange of application traffic 87, the correlation entity obtains updated information about the session for subscriber MS1 by querying Gi Probe 708 with the MSIP1 parameter. Context update logic on Gi Probe 708 locates the appropriate local record using the MSIP1 parameter and by identifying the record with a timestamp for message 82 that is closest to the timestamp of message 87. Upon locating the record, the Gi Probe context update logic provides the full content of the local mapping record to the correlation entity. This information allows the end user to identify the subscriber for all call records generated by the Gi Probe.

Similarly, when message 93 is captured, a new local mapping record 802 is created by Gi Probe 708. Local mapping record 802 is also stored on Gi Probe 708 and includes the MSISDN2 and APN2 parameters. However, local mapping record 802 is time-stamped with the time of message 93. When Gi Probe 708 detects Access Start Response message 94, it adds the IP1 parameter to local mapping record 802. When queried regarding messages 98, Gi Probe 708 searches for the record using the MSISDN, MSIP, and APN parameters. The MSIP will be the same for records 801 and 802. However, record 802 will have a timestamp that is closer to application traffic 98, and, therefore, context update logic (within Gi Probe 708) will select record 802 for call record information.

Preferably, the context update logic is capable of dealing with certain exceptions, such as messages received out-of-order. For example, Gi Probe 708 may receive application traffic message 87 before messages 82 and 83 or may receive message 98 before messages 93 and 94. Therefore, the local mapping record will not have been created. In one embodiment, the Gi Probe context update logic resolves this situation by prioritizing and time-sorting operations initiated by messages 82 and 83 (or messages 93 and 94) higher and earlier than application traffic messages 87 (or 98).

It is possible that the mapping record information may arrive from Gn/Gp Probe 707 before the local record is created on Gi Probe 708. In this situation, one embodiment of the present invention handles this problem by creating a new local mapping record 803 using the received subset of information. Upon receiving Access Start Request message 82 (or 93), the context update logic for Gi Probe 708 locates the local mapping record with the same MSISDN, MSIP, and APN. This search differs from the normal scenario because the context update logic searches for the local record with a timestamp that is the closest, earlier timestamp compared to the timestamp of message 82 (or 93). Upon locating record 803, the parameters from message 82 (or 93) are merged with the local record parameters. Subsequent queries by the Gi Probe context update logic are processed in the normal manner.

As noted above, a limited pool of IP addresses is allocated to GGSN 706. As a result, a specific IP address may be used at any time following the release of the previous context. In this exception scenario, the time between Access Stop Request message 90 for MS1 and Access Start Response message 94 for MS2 may be as short as a few milliseconds. This may result in Gi Probe 708 receiving a query for MS2 application traffic messages 98 before context mapping record is received from Gn/Gp probe 707 for the previous MS1 context. To handle this situation, application messages 98 are prioritized lower and later than the processing of Access Start messages 93 and 94. As a result, when the query initiated by application traffic message 98 is processed by the Gi Probe context update logic, the local mapping record for Access Start messages 93 and 94 will be located. This query is further qualified by associating MSISDN2 with the query. The local record initiated at the receipt of Access Start Request message 82 is not associated with a query for application traffic message 98 because the MSISDN parameters do not match. The Gi Probe responds to the query with the contents (MSISDN2, APN2, MSIP1) of the local mapping record. When the Gi Probe context update logic receives the context record from Gn/Gp Probe 707 following Create PDP Context Response message 95, the Gi Probe context update logic again responds to the query of message 98 with the updated local mapping contents, including IMSI2 and CHID2).

Figure 9:
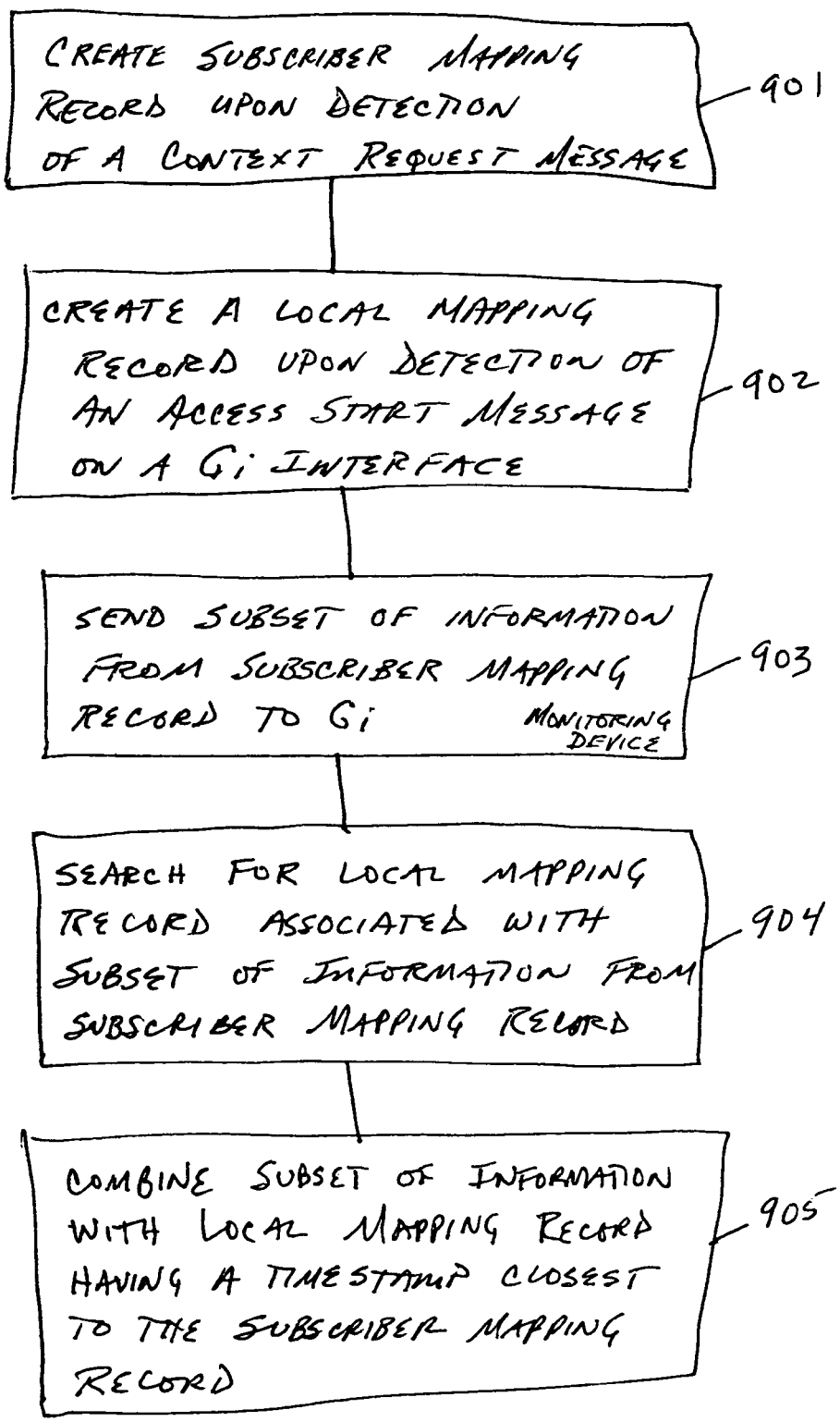
FIG. 9 is a flowchart illustrating an embodiment of a method used in the invention.

FIG. 9 is a flowchart illustrating a method used in one embodiment of the invention. In 901, a subscriber mapping record is created upon the detection of a context request message, such as a create PDP context request message. In one embodiment, this message is detected on a Gn or Gp interface by a Gn/Gp interface monitoring device. Preferably, the subscriber mapping record includes a timestamp associated with the context request message.

In 902, a local mapping record is created upon detection of an Access Start message on a Gi interface, such as an Access Start Request message or an Access Start Response message. This local mapping record is created, for example, on a Gi interface monitoring device. In a preferred embodiment, the local mapping record has a timestamp associated with the Access Start message. The Gn/Gp and Gi interface monitoring devices may be, for example, processor-based devices that capture signaling messages passing across one or more GPRS interfaces.

In 903, a subset of the subscriber mapping record information is sent to the Gi monitoring device. The subset of information may include, for example, Mobile Station International ISDN Number (MSIDSN), Access Point Name (APN), and Mobile Subscriber IP address (MSIP) parameters.

In 904, the Gi monitoring device searches for a local mapping record that is associated with the subset of information from the subscriber mapping record. In 905, the subset of information is combined with the local mapping record having a timestamp closest to the subscriber mapping record. After being updated with the subset of information from the subscriber mapping record, the local mapping record may include information that is not available from the Gi Interface messages, such as unique subscriber identification information or an International Mobile Subscriber Identity (IMSI) for the subscriber.

As noted above, the UMTS core network includes SGSN and GGSN components and the same interfaces as used in the GPRS network. Accordingly, one of skill in the art will understand that the discussion above may be applied to a UMTS network in the same manner as is described for a GPRS network. A network monitoring system of the type described herein may be used to monitor a UMTS network and to create UMTS subscriber mapping records. The subscriber record includes information captured from Gi Interface messages. Additionally, in some embodiments, unique subscriber information, such as IMSI information, may be included in the UMTS subscriber record.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for creating subscriber records in a packet data network, comprising:
   creating a first subscriber record at a first network monitoring device upon detection of a request to initiate a new subscriber session, wherein the first network monitoring device monitors messages on a first type of interface present in the packet data network;
   sending, from a second network monitoring device that monitors messages on a second type of interface present in the packet data network, information from a second subscriber record to the first network monitoring device upon detection of a message authorizing the creation of the new subscriber session; and
   combining, by the first network monitoring device, the information from the second subscriber record with the first subscriber record to form an updated first subscriber record.

2. The method of claim 1 wherein the request to initiate a new subscriber session is an Access Start Request message or an Access Start Response message on a Gi interface; and wherein the message authorizing the creation of the new subscriber session is a Create PDP Context Response message on a Gn or Gp interface.

3. The method of claim 1 wherein the first subscriber record includes a Mobile Station International ISDN Number (MSIDSN) and an Access Point Name (APN); and wherein the information from the second subscriber record includes a Mobile Subscriber IP address (MSIP).

4. The method of claim 1 further comprising:
   prioritizing the step of creating the first subscriber record ahead of processing of information received from the second subscriber record.

5. The method of claim 1 further comprising:
   prioritizing processing of captured Access Start Request or Access Start Response messages ahead of processing of other subscriber information.

6. The method of claim 1 further comprising:
   upon receiving second subscriber record information at the first network monitoring device, searching for an associated first subscriber record on the first network monitoring device.

7. The method of claim 6 wherein the searching step further comprises:
   searching for a first subscriber record having a particular group of Mobile Station International ISDN Number (MSIDSN). Access Point Name (APN), and Mobile Subscriber IP address (MSIP).

8. The method of claim 6 wherein the searching step further comprises:
   searching for a first subscriber record having a timestamp that is the closest, earlier timestamp relative to the timestamp of the second subscriber record.

9. The method of claim 1 wherein the first subscriber record includes information captured from Gi Interface messages, and wherein the combining step adds unique subscriber information that is not present in Gi Interface messages to the updated first subscriber record.

10. The method of claim 1 wherein the first subscriber record includes information captured from Gi Interface messages, and wherein the combining step adds subscriber identification information to the updated first subscriber record.

11. The method of claim 1 wherein the first subscriber record includes information captured from Gi interface messages, and wherein the combining step adds International Mobile Subscriber identity (IMSI) information to the updated first subscriber record.

12. The method of claim 1 wherein the packet data network is a General packet Radio Service (GPRS) network.

13. The method of claim 1 wherein the packet data network is a Universal Mobile Telecommunication System (UMTS) network.

14. A system for creating subscriber records in a packet data network, comprising:
   a first network monitoring device comprising a processor coupled to a Gn or Gp interface and operable to capture messages from the Gn or Gp interface and to create subscriber mapping records using data from the captured messages;
   a second network monitoring device comprising a processor coupled to a Gi interface and operable to capture messages from the Gi interface and to create local mapping records using data from the captured messages; and
   the second network monitoring device further comprising a processor for identifying a local mapping record associated with a subset of information from the subscriber mapping record and for combining the subset of information with the associated local mapping record.

15. The system of claim 14 wherein the processor coupled to the Gi interface creates the local mapping records upon detection of an Access Start Request message or an Access Start Response message.

16. The system of claim 14 wherein the processor coupled to the Gn or Gp interface creates the subscriber mapping records upon detection of a Create PDP Context Response message.

17. The system of claim 14 wherein the local mapping records include a Mobile Station International ISDN Number (MSIDSN) and an Access Point Name (APN); and wherein the information from the subscriber mapping records include a Mobile Subscriber IP address (MSIP).

18. The system of claim 14 wherein the processor for identifying a local mapping record associated with the a subset of information identifies the local mapping record having a timestamp that is the closest, earlier timestamp relative to the timestamp of the subscriber mapping record.

19. The system of claim 14 wherein the processor for combining adds International Mobile Subscriber Identity (IMSI) information to the local mapping record.

20. The system of claim 14 wherein the packet data network is a General Packet Radio Service (GPRS) network or a Universal Mobile Telecommunication System (UMTS) network.

21. A method for creating subscriber records in a GPRS network, the method comprising:
   upon detecting a request to initiate a new subscriber session, a first network monitoring device creates a first subscriber record, wherein the first network monitoring device monitors messages on a first type of interface present in the GPRS network;
   upon detection of a message authorizing creation of the new subscriber session a second network monitoring device sends information from a second subscriber record to the first network monitoring device, wherein the second network monitoring device monitors messages on a second type of interface present in the GPRS network; and
   combining, by context update logic of the first network monitoring device the information from the second subscriber record with the first subscriber record to form an updated first subscriber record.

22. The method of claim 21 wherein the first type of interface present in the GPRS network comprises a Gi interface and wherein the second type of interface present in the GPRS network comprises at least one of a Gn and a Gp interface.

23. The method of claim 22 wherein the request to initiate a new subscriber session is an Access Start Request message or an Access Start Response message on the Gi interface.

24. The method of claim 23 wherein the message authorizing creation of the new subscriber session is a Create PDP Context Response message on the Gn or the Gp interface.

25. The method of claim 22 wherein unique subscriber identification information is not present in messages monitored on the Gi interface.

* * * * *

UNITED STATES PATENT AND TRADEMARK OFFICE
CERTIFICATE OF CORRECTION

PATENT NO.         : 7,535,848 B2                                                      Page 1 of 1
APPLICATION NO.    : 11/217692
DATED              : May 19, 2009
INVENTOR(S)        : Wei Dong et al.

It is certified that error appears in the above-identified patent and that said Letters Patent is hereby corrected as shown below:

In the Drawings:

At Sheet 10 of 10, Figure 9, please delete the informal drawing of Figure 9 located on Sheet 10 of 10.

Column 13, Line 58, delete the portion of text reading "time address IP11" and replace with --time address IP1--.

Signed and Sealed this

Fourteenth Day of July, 2009

JOHN DOLL
*Acting Director of the United States Patent and Trademark Office*